(12) United States Patent
Fait et al.

(10) Patent No.: US 7,780,931 B2
(45) Date of Patent: Aug. 24, 2010

(54) PREPARATION FOR TIO2 POWDERS FROM A WASTE LIQUID CONTAINING TITANIUM COMPOUNDS

(75) Inventors: Anna Fait, Ferrara (IT); Arrigo Arletti, Finale Emilia-Modena (IT); Lucia Caiazzo, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 191 days.

(21) Appl. No.: 11/667,343

(22) PCT Filed: Nov. 3, 2005

(86) PCT No.: PCT/EP2005/055723

§ 371 (c)(1),
(2), (4) Date: May 8, 2007

(87) PCT Pub. No.: WO2006/051061

PCT Pub. Date: May 18, 2006

(65) Prior Publication Data

US 2008/0003152 A1    Jan. 3, 2008

Related U.S. Application Data

(60) Provisional application No. 60/629,121, filed on Nov. 18, 2004.

(30) Foreign Application Priority Data

Nov. 11, 2004  (EP)  .................................. 04105708

(51) Int. Cl.
*C01G 23/047* (2006.01)
*C01G 23/053* (2006.01)
*C01G 23/07* (2006.01)
*C01G 23/08* (2006.01)

(52) U.S. Cl. .............................. 423/69; 423/72; 423/76; 423/77; 423/78; 423/79; 423/598

(58) Field of Classification Search .................. 423/69, 423/72, 76–79, 598
See application file for complete search history.

(56) References Cited

U.S. PATENT DOCUMENTS

| | | | |
|---|---|---|---|
| 3,615,163 A | 10/1971 | Brzozowski | |
| 4,241,042 A | 12/1980 | Matijevic et al. | |
| 4,574,078 A | 3/1986 | Cortesi et al. | |
| 5,456,899 A | 10/1995 | Inchley | |
| 6,420,499 B1 * | 7/2002 | Garoff et al. | 526/123.1 |
| 6,440,383 B1 | 8/2002 | Duyvesteyn et al. | |
| 6,572,964 B2 * | 6/2003 | Tanaka et al. | 428/328 |

FOREIGN PATENT DOCUMENTS

WO    2005/063629    7/2005

* cited by examiner

*Primary Examiner*—Timothy C Vanoy
*Assistant Examiner*—Diana J Liao
(74) *Attorney, Agent, or Firm*—William R. Reid

(57) ABSTRACT

Process for preparing $TiO_2$ powders starting from a liquid comprising chlorinated titanium compounds, the process comprising:
a) atomizing said liquid and reacting the atomized liquid with a flow of steam and air at a temperature of 100-250° C. for converting said chlorinated titanium compounds to titanium dioxide $TiO_2$;
b) the gaseous phase and the entrained $TiO_2$ powders obtained from step a) are then fed to an oven operated at a temperature in the range 400-900° C. to remove the residual organic compounds and hydrochloridic acid from said powders.

26 Claims, 2 Drawing Sheets

PREPARATION FOR TIO2 POWDERS FROM A WASTE LIQUID CONTAINING TITANIUM COMPOUNDS

This application is the U.S. national phase of International Application PCT/EP2005/055723, filed Nov. 3, 2005, claiming priority to European Patent Application 04105708.4 filed Nov. 11, 2004, and the benefit under 35 U.S.C. 119(e) of U.S. Provisional Application No. 60/629,121, filed Nov. 18, 2004; the disclosures of International Application PCT/EP2005/055723, European Patent Application 04105708.4 and U.S. Provisional Application No. 60/629,121, each as filed, are incorporated herein by reference.

The present invention relates to a process for the preparation of titanium dioxide and in particular to a process for preparing titanium dioxide $TiO_2$ starting from a waste liquid containing chlorinated titanium compounds. In particular, the invention relates to a process involving the hydrolysis in a vapour phase of said waste liquid containing chlorinated titanium compounds.

Titanium dioxide powders are noteworthy from the commercial point of view, since these powders can find a valid application in many industrial fields. For instance, titanium dioxide is currently considered the main white pigment for commercial paints. Other important applications of $TiO_2$ powders include the use as a photocatalyst removing environmental pollutants, as an additive for plastic materials and an optical multi-coating reagent.

$TiO_2$ can be prepared in two different phases of crystalline structure, named "anatase" and "rutile". Because of its high photoactivity, the anatase phase has been used as a photocatalyst for the decomposition of acetone, phenol or trichloroethylene, and also as an oxidation system of nitric oxide and a conversion system of solar energy. Titanium dioxide with "rutile" phase has been widely used for white pigment materials, because of its scattering effect which protects from the ultraviolet radiation. It has also been used for optical coating, beam splitter and anti-reflection coating, since it has a high dielectric constant, a good refractive index and chemical stability, even under strongly acidic or basic conditions.

Generally, $TiO_2$ powders are fabricated by a chloride process, which is a gas-phase process, or by a sulfate process, which is a liquid-phase process.

The sulfate process is the older one and titanium sulfate ($TiSO_4$) is used as the starting material. A Titanium bearing source, generally ilmenite, is reacted with concentrated sulfuric acid at a temperature of 150-200° C. to obtain the titanium sulfate. According to this process, $TiSO_4$ is first conventionally hydrolyzed in a liquid phase at temperatures higher than 95° C., so that the titanium dioxide is precipitated from the liquid medium in a controlled manner. The obtained $TiO_2$ is then subjected to a calcination step at 800-1000° C., and to a successive intense micronization to break up the agglomerates formed during the calcination step. Some detrimental impurities are introduced during said calcination and pulverization steps, thus causing a lowering of the final quality of the obtained powders.

The gas-phase chloride process is presently the most used one, since it allows achieving final $TiO_2$ powders with an increased degree of purity. According to this process, the titanium ores, preferably ilmenite, are chlorinated at a high temperature so as to obtain the formation of gaseous $TiCl_4$. Said compound is then subjected to an oxidization step by contacting $TiCl_4$ with air or with superheated steam at a temperature generally higher than 1000° C. Short reaction times favor the formation of $TiO_2$ powder with the Anatase crystalline structure, while long reaction times favor the formation of powders having the Rutile crystalline structure. Large amounts of chlorine are formed during the above oxidation reaction, so that this method requires extra protection devices because of the corrosive effect of HCl and $Cl_2$, leading to increased production costs. Titanium dioxide powders prepared by means of the chloride process are fine but substantially rough, so that additional equipment for giving external electric fields or controlling reactant mixing ratios is required: the latter helps to control the particle shape and the particle size of the obtained powders.

U.S. Pat. No. 5,456,899 describes a process for the conversion of titanium chlorides to titanium dioxide by hydrolysis in aqueous solution. The process starts from an aqueous solution of a titanium chloride, which is suitably prepared by dilution of anhydrous titanium tetrachloride with water or hydrochloric acid. The hydrolysis of $TiCl_4$ is brought about by heating the above solution in the presence of a salt of a polymeric carboxylic acid. Suitable salts include ammonium or alkali metal salts of polycarboxylic acids, such as sodium polyacrylate, ammonium polyacrylate and sodium carboxymethyl cellulose. Usually, the aqueous solution of $TiCl_4$ is heated to a temperature of at least 80° C., preferably to a temperature between 100 and 110° C. Typically the solution is heated for a period from 3 to hours, needed to convert substantially all the titanium chloride to titanium dioxide. Once the hydrolysis is completed, the precipitated titanium dioxide can be separated from the aqueous mother liquors by filtration on a vacuum filter, pressure filter, centrifugation or other suitable equipment. The obtained particulate titanium dioxide is eminently suitable for the formation of electroceramic materials and generally has an average particle size between 0.1 and 1.0 μm.

U.S. Pat. No. 6,440,383 discloses a hydrometallurgical process for preparing ultrafine $TiO_2$ powders starting from aqueous titanium chloride solutions. These solutions may derive from processing mineral ores, in particular ilmenite ore or an ilmenite mineral concentrate. The starting $TiCl_4$ solution can be also obtained by hydration of anhydrous titanium tetrachloride and is generally comprised of water, hydrochloric acid, titanium oxychlorides and titanium chlorides. The solution is further converted to a titanium oxide solid in a process involving total, controlled evaporation of the solution and the formation of a thin film of titanium dioxide. This process step is conducted in the presence of a chemical control agent, above the boiling point of the aqueous solution and below the temperature where there is significant crystallization. Water and hydrochloric acid gas are vaporized and HCl can be recovered by any known process. Hydrolysis is preferably accomplished by spraying the solution while it is heated at a temperature in the range from 120 to 350° C., preferably from 200 to 250° C.: this process is called spray hydrolysis and can be carried out by means of a spray drier. The titanium dioxide product resulting from the spray hydrolysis is calcined at a temperature and for a length of time sufficient to convert the amorphous oxide to titanium dioxide of the desired crystal structure. Calcination temperatures can range between about 450° C. to over 1100° C., preferably from about 600 to 900° C. The calcination time is preferably maintained in the range from 30 minutes to about 8 hours. The product of calcination is a thin film showing a structure of individual units that can be broken up by milling into particles of the desired average size and size distribution. During calcination, any residual chloride in the amorphous $TiO_2$ feed is expelled as HCl gas, which can be recovered.

The above prior art techniques of preparation of the titanium dioxide are applied specifically to aqueous solutions of $TiCl_4$, deriving from the processing of mineral ores containing titanium, especially ilmenite. However, it should be taken into account that some widely developed industrial processes bring to the obtainment of large amounts of titanium tetrachloride as a process waste. This occurs especially in the industrial production of olefin polymerization catalysts, in particular of some Ziegler-Natta catalysts, where the use of large amounts of liquid $TiCl_4$ is necessarily involved.

High activity Ziegler-Natta catalyst components are known to be obtained by contacting a liquid phase containing $TiCl_4$ with a solid support or catalyst precursor comprising a magnesium compound. For instance, solid particles of a support based on a magnesium dihalide, such as $MgCl_2$, or particles of precursors based on a magnesium haloalcoholate, such as ethoxymagnesiumchloride or diethoxymagnesium, are contacted with a liquid phase containing dissolved $TiCl_4$ for a suitable reaction time. A preferred type of solid precursor consists of adducts of $MgCl_2$ with aliphatic alcohols, such as ethanol, usually containing from 1 to 6 moles of alcohol, in the form of spherical particles. As the reaction with the $TiCl_4$, either pure or in hydrocarbon solution, is exothermic, the initial temperature of the liquid phase containing the $TiCl_4$ is kept to a temperature-ranging from $-10°$ C. to $50°$ C. Such a temperature is then gradually raised to a value to be kept in the range from $50°$ C. to $150°$ C. in order to ensure an effective titanation of the adduct particles. In the preparation of stereospecific catalyst components also electron donor compounds, usually chosen among esters of carboxylic acids or ethers, are fed to the titanation step.

As a result of the above described reaction, the so obtained particles of catalyst component, after titanation, are discharged in form of slurry from the reaction vessel. Simultaneously a liquid stream comprising one or more solvents, the unreacted $TiCl_4$, chlorinated titanium alcoholates and other reaction by-products, for example those coming from the electron donor compound, is withdrawn from the reaction vessel and conveyed to a distillation section, aimed to recover both the titanium tetrachloride and the hydrocarbon solvents. Anyway, the distillation section can pursue only a partial and coarse recover of the titanium tetrachloride. The solvents are easily recovered from the top of a first distillation column, while the bottom product is sent to a vacuum distillation column: from the top of this vacuum column a considerable fraction of a substantially pure $TiCl_4$ is withdrawn, which can be recycled to the titanation step. On the other side, the product exiting the bottom of said vacuum column is a liquid comprising mostly $TiCl_4$ and chlorinated titanium alcoholates, but also little percentages of solid or liquid organic compounds deriving from the electron donors compounds fed during the titanation step of the solid catalyst component.

The currently used process for treating the above waste liquid discharged from the bottom of the vacuum column implies a treatment of hydrolysis in a liquid phase and a successive neutralization step by means of NaOH to neutralize the HCl formed during the hydrolysis reaction. This treatment involves the formation of large amounts of an aqueous slurry containing titanium hydroxide $Ti(OH)_4$ and organic by-products. Said aqueous slurry is sent to a filtration system for removing most of the liquid phase and thus obtaining a solid panel of relatively concentrated $Ti(OH)_4$ to be successively disposed. However, the described method shows several drawbacks, the main ones can be summarized as follows:

A) The treatment requires large amounts of $H_2O$: in fact, about 200 Kg of water are required for treating about 1 Kg of waste liquid. Therefore, after the hydrolysis reaction, large amounts of unreacted water with solid particles in suspension have to be sent to a depuration plant. Obviously, this depuration step considerably increases the overall costs of the process.

B) Large amounts of NaOH are needed for neutralizing the HCl deriving from the hydrolysis reaction: the handling of large amounts of waste liquid, water and NaOH requires a set of expensive mechanical equipment, especially pumps, so that the plant costs and operative costs make this process completely uneconomical.

C) The solid panel discharged from the filtration system has a low solid concentration, in fact the $Ti(OH)_4$ concentration is generally lower than 20-25% by weight, while the remaining is $H_2O$. This makes the volumes to be disposed very demanding.

D) The temporary storage of considerable amounts of said solid panel and their successive transport give rise to logistic problems and additional costs.

E) The above described process does not pursue any recover of Titanium-based compounds.

For all the above remarkable reasons, it was widely felt the need of finding a novel and more economic process for the treatment of the residual waste coming from the titanation of solid catalyst components.

Figure 1:
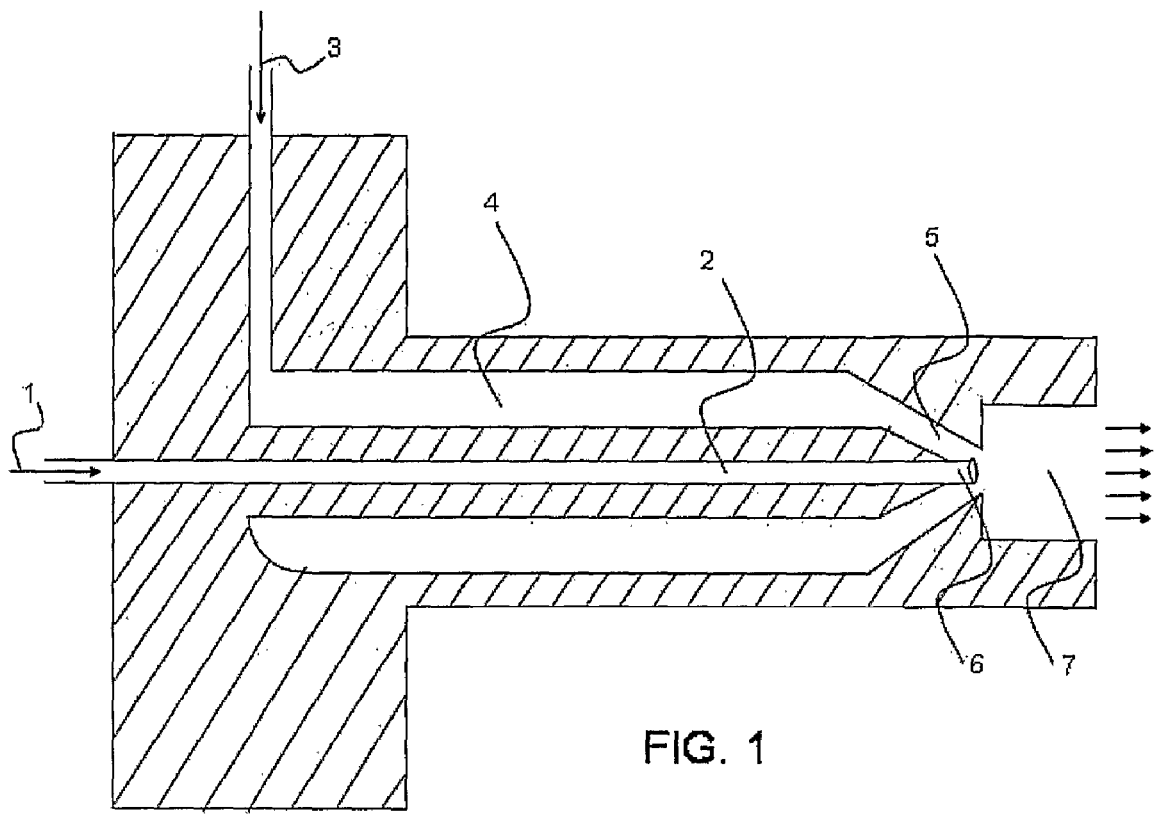
FIG. 1 illustrates an ejector used for atomizing liquid containing $TiCl_4$ and reacting the atomized liquid with steam.

The Applicant has now surprisingly found an alternative process for the treatment of a waste liquid comprising $TiCl_4$, this process providing not only a minimization of the plant and operative costs with respect to the known methods, but also being capable of operating a conversion of $TiCl_4$ to titanium dioxide, thus obtaining final $TiO_2$ powders as an useful commercial product.

It is therefore an object of the present invention a process for preparing $TiO_2$ powders starting from a liquid containing chlorinated titanium compounds, the process comprising:

a) atomizing said liquid and reacting the atomized liquid with a flow of steam and air at a temperature of 100-250° C. for converting said chlorinated titanium compounds to titanium dioxide ($TiO_2$) powders;

b) the gaseous phase and the entrained $TiO_2$ powders obtained from step a) are then fed to an oven operated at a temperature in the range of 400-900° C. to remove the residual organic compounds and hydrochloric acid from said powders.

The process of the present invention is aimed to the production of titanium dioxide starting from a titanium bearing source, which is not a titanium ore as in the conventional prior art processes, but an industrial waste product. Said waste product comes from the titanation step which is applied in the process for preparing high activity Ziegler-Natta solid catalyst components for the olefin polymerization in particular when starting from the above mentioned precursors. Therefore, an important and ambitious objective of the present invention is the obtainment of a product, $TiO_2$ powders, having an increasing commercial interest starting from a material usually addressed to be discarded.

As previously explained, the titanation of solid precursors particles involves the continuous discharge from the reaction vessel of a waste liquid comprising one or more hydrocarbon solvents, unreacted $TiCl_4$, chlorinated titanium alcoholates and other reaction by-products. This liquid stream is sent to a distillation section, aimed to recover the hydrocarbon solvents and partially the titanium tetrachloride. Thus, the liquid comprising chlorinated titanium compounds fed to step a) of the present invention is obtained by subjecting to distillation the residual waste coming from the titanation of the precursor. In particular, the liquid fed to step a) is obtained as the bottom product of this distillation section.

Specifically, the distillation section comprises a sequence of distillation columns, the last one being operated under vacuum: from the top of this vacuum column a considerable fraction of a substantially pure $TiCl_4$ is recovered and recycled to the titanation step, while a waste liquid is collected at the bottom of said vacuum column. This bottom product comprises mostly $TiCl_4$ and chlorinated titanium alcoholates, but also little percentages of solid or liquid organic compounds, as by-products of electron donor compounds fed during the titanation reaction. At the bottom of said vacuum column a temperature of about 90-115° C. is maintained, so that the bottom product is substantially a liquid with a density of around 1.7 Kg/dm$^3$, but if cooled its viscosity quickly increases up to a complete solidification. Thus, differently from pure $TiCl_4$ which is a liquid at room temperature, the waste liquid to be treated according to the present invention is a compact solid if brought to room temperature.

Specifically, titanium tetrachloride $TiCl_4$ and trichloroethoxy titanium $TiCl_3(OC_2H_5)$ are the main components of the waste liquid subjected to step a) of the invention when the starting catalyst precursor is a compound containing ethanol or ethoxy groups.

Step a) involves a hydrolysis of the above chlorinated titanium compounds in a vapor phase. Therefore, a suitable flow rate of said liquid is contacted with a flow of steam and air. Since the waste liquid reacts violently and instantaneously with steam, thus generating dense acid fumes containing fine solid suspension, the operative conditions to be selected out in step a) of the invention have to ensure a complete and fast conversion of the chlorinated titanium compounds to titanium dioxide.

The most important reactions which are supposed to occur in step a) of the process of the invention are the following ones:

$$TiCl_4 + 2H_2O \rightarrow TiO_2 + 4HCl \quad (1)$$

$$TiCl_3(OC_2H_5) + 2H_2O \rightarrow TiO_2 + 3HCl + C_2H_5OH \quad (2)$$

After an extensive investigation, our researchers have found that the best way of carrying out the hydrolysis step a) is attained when the waste liquid is atomized in little droplets just before the occurrence of the hydrolysis reaction. The atomization of the waste liquid ensures an extended contact surface between the liquid droplets and the flow of steam, thus increasing considerably the conversion rate of the reaction. Step a) implies an instantaneous conversion of the chlorinated Ti compounds to solid powders of $TiO_2$: the contact times between the reactants are lower than 1 second, so that the reaction volume can be minimized leading to a considerable saving on the plant costs. In fact, the formation of large amounts of highly corrosive hydrochloridic acid requires the use of special highly-resistant materials which are very expensive: thus, a minimization of the reactor volume means a reduction of the plant costs.

Generally step a) is fed with a molar ratio steam/liquid comprised in the range 2-15, preferably in the range 3-10. The weight ratio air/steam in step a) is generally selected in the range 1-10, preferably 2-8.

As regards the single behavior of steam and air, only steam is the reactant in step a), while air has the function of a carrier gas entraining away the formed $TiO_2$ powders and conveying them to step b). At the low temperatures at which step a) is operated, no combustion of the organic compounds contained in the $TiO_2$ powders can occur by the action of the oxygen contained in the air.

The range of temperatures selected in step a) avoids any eventual partial condensation of steam with formation of droplets of liquid water having a detrimental effect onto the obtained $TiO_2$ powders. In fact, the presence of liquid droplets of $H_2O$ can cause the agglomeration of said powders, and the formation of tacky lumps adhering to the walls of the apparatus in which step a) is carried out.

Any device known in the art for providing the atomization of the waste liquid can be exploited to carry out the process of the present invention. For instance, the atomization in little droplets can be attained by impacting at a high velocity the flow of steam+air against said liquid containing the chlorinated titanium compounds. This impact causes a shear of the liquid and the consequent formation of liquid droplets.

To this purpose, a suitable velocity for the stream of waste liquid is in the range 10-200 m/s, while a suitable velocity for the flow of steam+air is in the range 40-200 m/s, preferably 100-200 m/s.

According to a preferred embodiment of the process of the invention, step a) can be carried out in an ejector allowing the atomization of the waste liquid and the successive hydrolysis at an extremely high kinetics. The best results in term of atomization have been achieved planning two coaxial flows of reactants, which run in a parallel direction. Specifically, the ejector is endowed with a central pipe for the flow of the liquid comprising chlorinated titanium compounds and an outer annular pipe for the flow of steam+air. The outlet of said outer annular pipe is converging into the outlet of the central pipe, so that these two streams join each other in a contacting chamber, where the flow of waste liquid is sheared by the flow of steam, which impacts against it at a high velocity. The high velocity of the steam flow generates a high level of turbulence inside the contacting chamber, so that an instantaneous atomization of the waste liquid into the flow of steam and air is induced with the consequent formation of liquid droplets.

Once formed, said droplets react with steam according to step a) and the obtained $TiO_2$ powders are then entrained away from the continuous flow of air, which hinders their deposition by gravity on the ejector walls.

$TiO_2$ powders coming from the hydrolysis step a) are well far from possessing a high level of purity. They may show a grey-yellow color due to the presence of residuals of electron donor compounds and have a high percentage of chlorine (as HCl), of about 2-10% by weight. Also the percentage of organic compounds, in the range of about 1-5% by wt, is not negligible. Such powders cannot be used in commercial applications and need a further processing to minimize the presence of such impurities. As regards their physical features, these powders show a poured bulk density of about 0.15-0.3 gr/cm$^3$ and a particle size distribution of 5-10 micron.

The gaseous stream entraining the formed $TiO_2$ powders and coming from the outlet of step a) is directly introduced into an oven operated at a high temperature for volatilizing the hydrochloridic acid and oxidizing the residual organic compounds contained in the $TiO_2$ powders. Step b) of the present invention is carried out in said oven, wherein the product of the hydrolysis reaction is heated to a temperature in the range 400-900° C., preferably 500-650° C., to remove most of residual organic compounds and HCl from the $TiO_2$ powders.

The air fed to step a) is not only a carrier gas as above explained, but it has also the additional function of providing the oxygen required to carry out the combustion step b). The oven of step b) can be a rotative furnace or, alternatively, a stationary oven endowed with a stirring device. In both cases, the rotation device has the function of minimizing the likelihood of obstruction in the regular sliding of the powder towards the outlet from the oven. Moreover, this oven is preferably downwardly inclined to foster the flowability of the $TiO_2$ powders towards the discharge. The top portion of the oven is endowed with a filtering cartridge having the function of avoiding the discharge of the finest $TiO_2$ powders together with the gaseous phase discharged from the top of the oven.

Preferably the reaction product of step a) is directly fed to the inlet of this oven avoiding the presence of any connection pipe. In fact, in some circumstances said connection pipe could be clogged by the $TiO_2$ powders.

In step b) a residence time of the powders inside the oven of about 30-180 minutes, preferably 60-120 minutes, allows to achieve a drastic reduction of the percentages of HCl and organic compounds contained in the powders. The high temperatures adopted in step b) cause the volatization and oxidation of these impurities, so that a gaseous phase containing mainly $HCl, Cl_2, H_2O, N_2, O_2, CO_2$ collects at the top portion of the oven, from which said gaseous stream is discharged.

The oven of step b) can be L-shaped: this means that it comprises a top cylindrical portion formed around a vertical axes and a bottom portion formed around a downward-inclined axes. The gaseous stream entraining the $TiO_2$ powders is introduced into the top cylindrical portion, so that the powders fall by gravity into the bottom portion of the oven. This bottom portion is endowed with a mechanical stirrer, which favors the plug flow of the powders towards the outlet.

The gaseous phase discharged from the top portion of the oven contains $HCl, N_2, O_2, CO_2$ as the major components and $H_2O$, ethyl chloride and other chlorinated compounds, such as di-chloroethane, di-chloromethane, as the minor components. These chlorinated compounds can be removed from the gaseous effluent leading their content to values according to the environment regulations, before carrying out their discharge into atmosphere. To this aim, the gaseous phase discharged from the oven can be passed to a scrubber, where it is washed by means of water: a countercurrent flow of water dissolves the HCl, thus removing this acid from the gas. Thereafter, the gaseous effluent coming from the scrubber can be conveyed to an incinerator, operated at a temperature higher than 900° C., preferably 1000-1300° C., to carry out the combustion of ethyl chloride and other chlorinated compounds, thus purifying the gas before its discharge into atmosphere. The powders discharged from step b) of the present invention comprises mostly $TiO_2$ in a percentage generally higher than 97% by weight, the remaining being formed by $Ti(OH)_4$, $H_2O$ and HCl. The percentage of residual chlorine (as HCl) is now decreased to a value lower than 8000 ppm by weight and the amount of organic compounds is negligible. These powders show a white coloration and Anatase crystalline structure.

As regards their physical features, these powders show a poured bulk density of about 0.4-0.6 gr/cm$^3$ and a particle size distribution of 5-10 micron.

If desired, depending on the specific application to which the powders are aimed, the titanium dioxide particles coming from the combustion step b) can be subjected to milling for obtaining nano-sized particles, which are the favorite ones in most of the commercial application. For instance, an average particle size of 150 to 250 nm is the preferred one for the use as a white pigment in paint industry, while an average particle size of 10 to 100 nm is the preferred one for the use in cosmetics, personal care products, surface coatings and photovoltaic applications.

The process of the present invention will now be described in details with reference to the enclosed drawings, which are illustrative and not limitative of the scope of the claimed process.

As indicated in FIG. 1, a waste liquid comprising chlorinated titanium compounds and by-products is fed via line 1 to the central pipe 2 of an ejector, while a stream of steam+air is fed via line 3 to an annular pipe 4 surrounding the central pipe 2 of the ejector. The central pipe 2 and the annular pipe 4 are coaxial and run in the same direction along the horizontal axis of the ejector.

The terminal end 5 of the annular pipe 4 is converging into the outlet 6 of the central pipe 2, so that the flow of waste liquid is sheared by the flow of steam impacting at a high velocity against the liquid: an instantaneous atomization of the waste liquid is induced with the formation of liquid droplets inside the flow of steam and air. The hydrolysis reaction of step a) between the droplets of atomized liquid and steam can thus easily take place in the successive contacting chamber 7, where the formed $TiO_2$ powders are entrained away from the flow of air, acting as a carrier gas.

Figure 2:
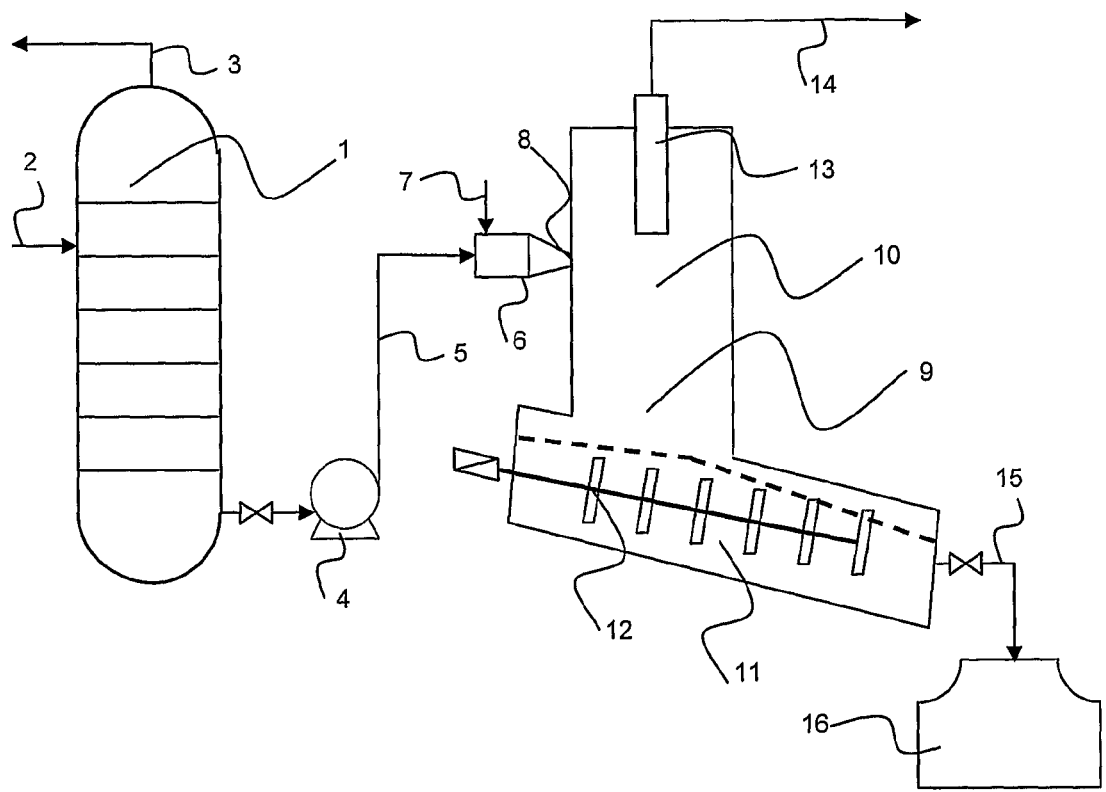
FIG. 2 illustrates the ejector of FIG. 1 directly coupled to an L-shaped oven in a process for preparing $TiO_2$ powders from a liquid stream.

FIG. 2 is a diagrammatic representation of the main operative steps according to the process of the invention. As above explained a liquid stream comprising unreacted $TiCl_4$, chlorinated titanium alcoholates and other by-products deriving from the titanation of solid catalyst components is sent to a distillation section comprising a sequence of distillation columns. Only the last distillation column 1 is shown in FIG. 2, and this column operates under vacuum. The waste liquid is fed to the vacuum column 1 via line 2 and from the top of this column pure $TiCl_4$ is recovered and recycled via line 3 to the titanation reactor (not shown).

A waste liquid comprising chlorinated Ti compounds and by-products is collected at the bottom of the vacuum column 1. Said waste liquid is continuously withdrawn from the bottom of column 1 by means of a gear pump 4 and then conveyed via line 5 to the ejector 6 to carry out the hydrolysis reaction according to step a). A flow of steam and air is simultaneously fed via line 7 to the ejector 6. A gaseous stream entraining the formed $TiO_2$ powders is discharged from the ejector 6. The outlet of the ejector 6 is directly connected to the inlet 8 of a L-shaped oven 9, wherein the high temperature causes the volatization and oxidation of the residual organic compounds and HCl contained in the $TiO_2$ powders. The gaseous stream entraining the $TiO_2$ powders is introduced into the top portion 10 of the oven 9 and the powders fall by gravity into the bottom portion 11 of the oven. The bottom portion 11 of the oven 9 is endowed with a mechanical stirrer 12, which favors the plug flow of the powders towards the outlet from the oven.

The top portion 10 of the oven is endowed with a filtering cartridge 13 having the function of avoiding the discharge of the finest $TiO_2$ powders together with the gaseous effluent which is discharged from the top of the oven via line 14. The powders accumulate inside the bottom portion 11 of the oven, from which they are discharged via line 15. The obtained powders are then conveyed to a storage vessel 16 before to be subjected to an eventual milling step (not shown).

The following examples will further illustrate the present invention without limiting its scope.

EXAMPLES

The present invention is carried out by means of the process setup as shown in FIG. 2.

Step a) is carried out in the ejector as described in connection with FIG. 1.

Step b) is carried out in a L-shaped oven as described in connection with FIG. 2

The waste liquid comprising chlorinated titanium compounds is continuously withdrawn from the bottom of the distillation column shown in FIG. 2 and is conveyed to the ejector for the hydrolysis reaction.

Example 1

Step a)

The feeding to step a) is a waste liquid having the following composition:

| | |
|---|---|
| $Ti^{+4}$ | 15.1% weight |
| $Cl^-$ | 63.0% wt |
| $C_2H_5OH$ | 1.45% wt |
| other organic compounds | 20.45% wt |

1.4 Kg/h of the above waste liquid are fed to the central pipe of the ejector, while a flow of steam+air is fed to the annular pipe surrounding the central pipe of the ejector.

The velocity of the liquid running the central pipe of the ejector is of 49.5 m/s, while the velocity of the flow of steam+air in the annular pipe is of 165 m/s.

The molar ratio steam/waste liquid is 8.8, while the weight ratio air/steam is 2.8.

The hydrolysis reaction between the droplets of atomized liquid and steam takes place at the outlets of the above pipes in a contacting chamber at a temperature of 135° C. for a reaction time of about 0.5 sec.

$TiO_2$ powders in an amount of about 0.43 Kg/h are formed by reaction between steam and the atomized liquid. These powders are entrained away from the flow of air acting as a carrier gas, which introduces the powders directly into the oven of step b).

Step b)

The powders coming from the hydrolysis step a) show a grey color and, besides $TiO_2$, contain some impurities. In particular, their composition is analyzed bringing to the following result:
86.7% by wt of $TiO_2$
0.15% by wt of $Ti(OH)_4$
7.9% by wt of HCl
1.3% by wt of $H_2O$
3.95% by wt of organic compounds The gaseous stream entering the oven of step b) has the following composition:

| | |
|---|---|
| HCl | 13.87% mol |
| $H_2O$ | 24.47% mol |
| $N_2$ | 50.0% mol |
| $O_2$ | 11.66% mol |

Step b) is operated at a temperature of 620° C. to oxidize the residual organic compounds and volatilize HCl contained in the $TiO_2$ powders. The average residence time of the powders in step b) is maintained at a value of 2 hours.

The powders discharged from the bottom of the oven show a white color and comprise a high percentage of $TiO_2$. In particular, their composition is as follows:
99.43% by wt of $TiO_2$
0.10% by wt of $Ti(OH)_4$
0.31% by wt of HCl
0.16% by wt of $H_2O$ The amount of organic compound in the above powders is negligible.

As regards their physical features, the $TiO_2$ powders obtained by the process of the invention show a poured bulk density of 0.48 gr/cm³ and a particle size distribution of 5-10 micron.

Example 2

Step a)

The feeding to step a) is a waste liquid having the following composition:

| | |
|---|---|
| $Ti^{+4}$ | 23.2% weight |
| $Cl^-$ | 68.3% wt |
| $C_2H_5OH$ | 1.7% wt |
| other organic compounds | 6.8% wt |

1.9 Kg/h of the above waste liquid are fed to the central pipe of the ejector, while a flow of steam+air is fed to the annular pipe surrounding the central pipe of the ejector.

The velocity of the liquid running the central pipe of the ejector is of 67 m/s, while the velocity of the flow of steam+air in the annular pipe is of 165 m/s.

The molar ratio steam/waste liquid is 4, while the weight ratio air/steam is 3.5.

The hydrolysis reaction between the droplets of atomized liquid and steam takes place at the outlets of the above pipes in a contacting chamber at a temperature of 120° C. for a reaction time of about 0.5 sec.

$TiO_2$ powders in an amount of about 0.82 Kg/h are formed by reaction between steam and the atomized liquid. These powders are entrained away from the flow of air acting as a carrier gas, which introduces the powders directly into the oven of step b).

Step b)

The powders coming from the hydrolysis step a) show a yellow color and, besides $TiO_2$, contain some impurities. In particular, their composition is analyzed bringing to the following result:
93.7% by wt of $TiO_2$
0.1% by wt of $Ti(OH)_4$
3.3% by wt of HCl
0.6% by wt of $H_2O$
2.3% by wt of organic compounds The gaseous stream entering the oven of step b) has the following composition:

| | |
|---|---|
| HCl | 25.6% mol |
| $H_2O$ | 12.84% mol |
| $N_2$ | 49.96% mol |
| $O_2$ | 11.6% mol |

Step b) is operated at a temperature of 520° C. to oxidize the residual organic compounds and volatilize HCl contained in the $TiO_2$ powders. The average residence time of the powders in step b) is maintained at a value of 1.5 hours.

The powders discharged from the bottom of the oven show a white color and comprise a high percentage of $TiO_2$. In particular, their composition is as follows:

99.0% by wt of $TiO_2$
0.1% by wt of $Ti(OH)_4$
0.76% by wt of HCl
0.23% by wt of $H_2O$

The amount of organic compound in the above powders is negligible. As regards their physical features, the $TiO_2$ powders obtained by the process of the invention show a poured bulk density of about 0.54 gr/cm$^3$ and a particle size distribution of 5-10 micron.

The invention claimed is:

1. A process for preparing $TiO_2$ powders starting from a liquid comprising chlorinated titanium compounds, the process comprising:
   a) atomizing said liquid with a flow of steam and air, thereby forming an atomized liquid, and reacting the atomized liquid with the steam at a temperature of 100-250° C. to convert said chlorinated titanium compounds to titanium dioxide ($TiO_2$) powder, thereby forming a gaseous phase;
   b) feeding the gaseous phase and the entrained $TiO_2$ powder obtained from step a) to an oven comprising an inlet and a top portion, operated at a temperature in the range 400-900° C. to remove residual organic compounds and hydrochloridic acid from said powders.

2. The process according to claim 1, wherein said liquid comprising chlorinated titanium compounds is obtained by subjecting to distillation a residual waste coming from the titanation of solid catalyst components.

3. The process according to claim 2, wherein said liquid comprising chlorinated titanium compounds is obtained as a bottom product of said distillation.

4. The process according to claim 1, wherein the main components of said liquid are titanium tetrachloride and trichloroethoxy titanium.

5. The process according to claim 1, further comprising contact times between the reactants in step a) of lower than 1 second.

6. The process according to claim 1, further comprising in step a) a molar ratio steam/liquid in the range 2-15.

7. The process according to claim 6, wherein the molar ratio steam/liquid is in the range 3-10.

8. The process according to claim 1 further comprising a weight ratio of air/steam in step a) in the range 1-10.

9. The process according to claim 1, wherein air in step a) acts as a carrier gas entraining away the formed $TiO_2$ powders and conveying them to the oven.

10. The process according to claim 1, wherein the atomization of said liquid in step a) is attained by impacting at a high velocity said flow of steam and air against said liquid comprising chlorinated titanium compounds.

11. The process according to claim 10, further comprising a velocity of said liquid in the range 10-200 m/s.

12. The process according to claim 10 further comprising a velocity of said flow of steam and air in the range 40-200 m/s.

13. The process according to claim 10, wherein the atomization is carried out inside an ejector comprising a central pipe for the flow of said liquid comprising chlorinated titanium compounds and an outer annular pipe for the flow of steam and air, the outlet of said annular pipe converging into the outlet of said central pipe.

14. The process according to claim 1, wherein the temperature of step b) is in the range 500-650° C.

15. The process according to claim 1, wherein the oven of step b) is a rotative furnace or a stationary oven comprising a stirring device.

16. The process according to claim 15, wherein said oven is downwardly inclined to foster powder flowability.

17. The process according to claim 15, wherein the top portion of said oven is endowed with a filtering cartridge.

18. The process according to claim 1, wherein the reaction product of step a) is directly fed to the inlet of said oven.

19. The process according to claim 1, wherein step b) is operated with a residence time of the powders inside said oven in a range of 30-180 minutes.

20. The process according to claim 1, further comprising a gaseous phase discharged from the top portion of said oven comprising HCl, $N_2$, $O_2$, $CO_2$ as the major components and $H_2O$, ethyl chloride and other chlorinated compounds as the minor components.

21. The process according to claim 20, wherein said gaseous phase discharged from said oven is washed by water inside a scrubber for removing HCl from said gaseous phase, the scrubber comprising a gaseous effluent.

22. The process according to claim 21, wherein the gaseous effluent coming from said scrubber is conveyed to an incinerator operated at a temperature higher than 900° C.

23. The process according to claim 1, wherein the powders discharged from step b) comprise $TiO_2$ in a percentage higher than 97% by weight.

24. The process according to claim 1, wherein the powders discharged from step b) have a percentage of residual chlorine (as HCl) lower than 8000 ppm by weight.

25. The process according to claim 1, wherein the powders discharged from step b) comprise a poured bulk density of about 0.4-0.6 gr/cm$^3$ and a particle size distribution of 5-10 micron.

26. The process according to claim 1, wherein the powders discharged from step b) are milled to obtain nano-sized particles.

* * * * *